June 30, 1964 B. D. CAHAN Re. 25,608

ELECTRIC BATTERY

Original Filed Dec. 21, 1959

INVENTOR.
BORIS D. CAHAN

BY Robert J. Staples
ATTORNEY

United States Patent Office

Re. 25,608
Reissued June 30, 1964

25,608
ELECTRIC BATTERY

Boris D. Cahan, Philadelphia, Pa., assignor to The Electric Storage Battery Company, a corporation of New Jersey Original No. 3,017,448, dated Jan. 16, 1962, Ser. No. 861,020, Dec. 21, 1959. Application for reissue Nov. 20, 1963, Ser. No. 332,989
11 Claims. (Cl. 136—26)

Matter enclosed in heavy brackets [ ] appears in the original patent but forms no part of this reissue specification; matter printed in italics indicates the additions made by reissue.

The present invention relates to alkaline batteries of the type utilizing silver positive electrodes. More specifically, the present invention is concerned with an additive for batteries of the type described which reduces gassing, lowers cell resistance, and increases efficiency.

Silver electrodes are widely used in both primary and secondary batteries. It has long been known, however, that the divalent oxide of silver (AgO) evolves oxygen when it is in contact with aqueous solutions of alkaline electrolytes and that this undesirable effect increases with increasing temperature. While the gassing of divalent silver oxide causes some self-discharge of the positive electrode, there is an even more serious limitation to the utilization of this material as [a depolarizer] *an active material.* It is often desirable to hermetically seal alkaline batteries to prevent a reaction between the electrolyte and carbon dioxide in the atmosphere, to eliminate electrolyte leakage, or to prevent the evaporation of water from the electrolyte. The gassing of divalent silver oxide creates a serious hazard in such sealed cells since it causes a build-up of pressure within the cells which can result in a violent rupture of the cell casing.

It is, therefore, an object of the present invention to provide a means for reducing the gassing of the divalent oxide of silver in alkaline electrolytes.

Another undersirable characteristic of the oxide of silver which limits the application of silver as [a depolarizer] *an active material* is the relatively high electrical resistance of its monovalent oxide. This characteristic produces a high cell impedance which limits the application of cells utilizing silver electrodes. For example, it has been found that the utilization of batteries having a high internal resistance as the power source for electronic amplifiers of the type employed in hearing aids and radios, tends to promote feedback which contributes to the instability of such amplifiers.

Accordingly, it is another object of the present invention to provide a means for reducing the resistance of [formed] *charged* silver electrodes.

In the [formed] *charged* state, the active materials of a silver electrode are divalent silver oxide, AgO, and monovalent silver oxide, $Ag_2O$. As the discharge of a silver electrode begins, the divalent silver oxide in the region of electrical contact with the electrode is reduced to monovalent silver oxide. The monovalent silver oxide thus formed, being a much poorer conductor than the divalent silver oxide, tends to isolate the remaining divalent silver oxide in the electrode from discharge and itself is discharged to silver. This silver, which is an excellent conductor, however, does not make the remaining divalent silver oxide available for discharge because it chemically combines with the divalent silver oxide in the presence of the electrolyte to form monovalent silver oxide. As a result of these phenomena, the full divalent silver oxide capacity of a silver electrode is seldom [achieved] *utilized* on discharge.

It is a further object of the present invention to provide a means for increasing the efficiency of silver electrodes, by permitting the utilization of the voltage plateau available from the discharge of divalent silver oxide of such electrodes.

In accordance with the present invention, lead, lead oxide (PbO) or other compound of lead is added to the active material of a silver electrode in an amount from about 0.1% to about 5.0% by weight of the silver in the electrode. In the presence of alkaline electrolyte, the silver oxides and the lead or lead compound react to form a coating on the silver oxide particles which has been identified as silver plumbate, $Ag_2PbO_3$ or $Ag_5Pb_2O_6$. This coating or film reduces the gassing rate of a divalent silver oxide electrode by a factor of about four, substantially decreases the electrical resistance of such an electrode and provides an electrode discharge which [achieves] *utilizes* almost 100% of the theoretical divalent silver oxide capacity at the upper voltage plateau.

While the mechanism which makes possible the above described improvements in the performance of a silver electrode is not fully understood, it is believed that the silver plumbate film, which is stable in alkaline electrolyte, isolates a substantial portion of the divalent silver oxide from contact with the electrolyte and in this manner inhibits gassing. It is also possible that at least part of the mechanism responsible for the reduction of gassing consists of the electrolytic or chemical reduction of sharp ridges and points on the surfaces of the silver oxide particles thus eliminating normally active centers of oxygen evolution. With respect to the increased electrode conductivity and capacity it should be noted that silver plumbate is an exceptionally good conductor having a specific resistivity of approximately $3\times10^3$ ohm-cm. As a result of its high conductivity and the fact that it is not reduced until after both of the silver oxides are reduced, it is believed that the silver plumbate film described above provides a conductive matrix which permits the discharge of substantially all of the divalent silver oxide present in the electrode to its monovalent state during electrode discharge.

Still further, in accordance with the present invention, two preferred methods have been developed for the addition of lead or lead compounds to divalent silver oxide. This first of these preferred methods is to mix intimately and homogeneously finely divided lead or compounds of lead with the silver or silver oxide prior to pasting it or pressing it to form an electrode. It has also been found that lead or lead compounds may be dissolved in *the* electrolyte and thus may be introduced into the cell in this manner with the formation of silver plumbate being achieved in situ.

A better understanding of the present invention may be had from the following description when read with reference to the accompanying drawings of which:

Figure 1:
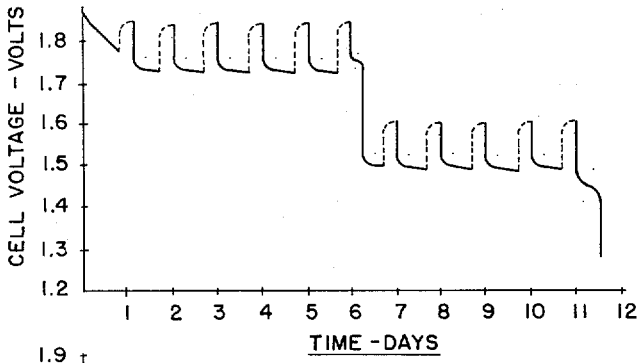
FIG. 1 is a curve illustrating the discharge characteristics of a silver-zinc primary cell in which lead oxide was added in the amount of 2.5% by weight of the divalent silver oxide used therein.

In carrying out one form of the present invention, finely divided lead oxide powder is intimately mixed with finely divided divalent silver oxide powder and the mixture compressed into pellets for use as positive electrodes in button type primary cells. A pressure of 2500 pounds per square inch has been found suitable to form the pellets, which are 0.076″ thick and 0.48″ in diameter. In order to determine the effect of the addition of lead oxide on the impedance of this type of electrode, pellets of the type described above were made utilizing varying percentages of lead oxide. The impedances of cells utilizing these electrodes were then compared with that of a conventional cell containing no lead oxide.

Each of the cells tested had a positive electrode of the type described above and a negative electrode comprising of a pellet 0.061" thick and 0.355" in diameter of zinc with 7% mercury. The electrolyte utilized in these cells was comprised of 48 parts sodium hydroxide, 10 parts zinc oxide, and 100 parts of distilled water. The separation between the two electrodes comprised a synthetic resin fabric, which was utilized as the electrolyte reservoir, and a porous polyethylene membrane impregnated with an ion exchange resin. These components were sealed in a [timed] *tin coated* steel case.

The impedances of the various cells tested are indicated in the table below:

| Cell | Percent PbO | Cell Impedance, ohms |
|---|---|---|
| A | None | 5.6 |
| B | 1.5 | 3.3 |
| C | 2.5 | 2.8 |
| D | 5.0 | 3.75 |
| E | 10.0 | 3.8 |

As can be seen from an examination of this table, the effect of the addition of the lead oxide was to substantially reduce the impedance of all of the cells. In particular, it should be noted that in the case of cell C, where lead oxide was present in an amount of 2.5%, by weight of the silver oxide, that the impedance of the cell was reduced by 50%.

As discussed hereinbefore, the reduction of cell impedance can be attributed to the formation on the silver oxide particles of a thin coating of silver plumbate. As can be seen from the results of this test, the silver plumbate film reduces the impedance of the positive electrode to the point where it is no longer a substantial part of the total cell impedance, the residual impedance representing the separator membrane and electrolyte.

It has also been found that it is possible to introduce the lead oxide into the button cells of the type described by dissolving the desired percentages of lead oxide in the cell electrolyte. This may be done either in situ or prior to the introduction of the electrolyte into the cell.

In addition to reducing the impedance of the type of cells tested, it was also found that the formation on the silver oxide particles of a surface coating of silver plumbate substantially improved cell efficiency by making available for discharge the voltage plateau of the divalent silver oxide. Curves showing the discharge of two button cells of the type described above, one cell containing 2.5% lead oxide by weight of the divalent silver oxide and other cell without the lead oxide are shown in FIGS. 1 and 2 respectively.

Figure 2:
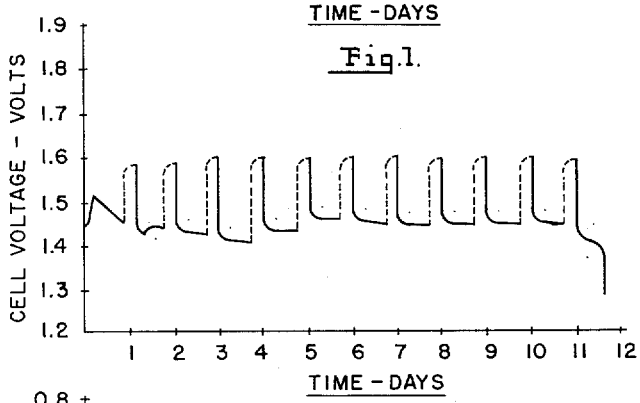
FIG. 2 is a curve showing the discharge characteristics of a silver-zinc primary cell identical to the one utilized in connection with the curve of FIG. 2, but without lead oxide.

Referring now to the curves of FIGS. 1 and 2, the solid lines represent cell voltage at a discharge rate of 5 milliamps, and the dotted lines show cell voltage during recovery. As can be seen quite clearly, both cells gave approximately the same milliamp hour capacity, but as shown in FIG. 1, the cell with the lead oxide showed a higher watt-hour capacity because of the elevations of the first voltage plateau. It also should be noted that the cell with the lead oxide present also exhibited lower polarization during the second plateau of discharge. These effects are attributed to the conductive matrix formed by the silver plumbate which prevents the electrical isolation of divalent silver oxide of the electrode.

Figure 3:
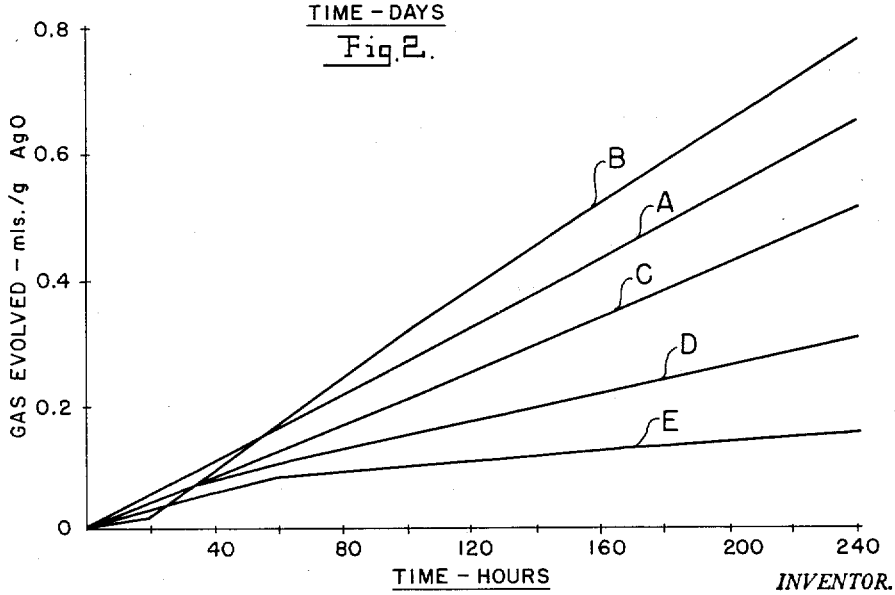
FIG. 3 shows curves illustrating the reduction of oxygen evolution achieved by the addition of lead in specified percentages to divalent silver oxide.

In addition to reducing the impedance of a cell and increasing cell efficiency, it has been found that the formation of a surface film of silver plumbate on the silver oxide particles by the addition of lead oxide also reduces the gassing rate of divalent silver oxide in alkaline electrolytes. In order to determine the extent of this effect, measurements were made of the amount of gas evolved when divalent silver oxide was placed in alkaline electrolytes of various concentration with varying amounts of lead oxide dissolved therein. Referring now to FIG. 3, there is shown the results of one of these tests in which the electrolyte utilized was a 40% solution of potassium hydroxide. The curve A shows the gassing rate of divalent silver oxide in this electrolyte when no lead oxide is dissolved therein. As shown by curve B, the addition of 10% lead oxide increased the gassing rate slightly, however, with lesser amounts of lead oxide added, as shown by curves C, D, and E, wherein lead oxide was present in the amounts of 4%, 2% and 1% by weight of silver oxide respectively, the gassing rate of the divalent silver oxide was markedly reduced with the greatest reduction being achieved when the lead oxide was present in the amount of 1%. Similar results were obtained with other concentrations of potassium hydroxide and also with other alkaline electrolytes.

While the present invention has been described hereinbefore in connection with the addition of lead oxide to the electrolyte or to the silver electrode itself, it should be understood that the present invention is applicable to the addition of lead or other lead compounds which will form the silver plumbate film described in situ. In this respect, lead, lead hydroxide and sodium plumbite are typical of other materials which may be utilized. In the case of each of these compounds, it should be noted that to achieve the improved performance described hereinbefore, the preferred range for the addition of lead, lead oxide, lead hydroxide or sodium plumbite to a silver electrode is from about 0.1% to about 5% by weight of the silver in the electrode with the optimum range being between 1% and 3% by weight of the silver in the electrode. With respect to the lowest limit stated, it has been found that when the lead or lead compounds are added in amounts appreciably below 0.1% that the effect of the addition is unnoticable. With respect to the upper limit of 5% by weight of the silver in the electrode, it should be noted that at this point the loss of silver electrode capacity by the substitution of lead becomes an important factor.

While the examples of electrode performance given hereinbefore have been given with respect to a button primary cell formed of divalent silver powder, it should be understood that the teachings of the present invention are applicable to all types of silver electrodes for primary applications as well as secondary applications. For example, lead or lead compounds may be added to the silver of a pasted type electrode or may be intimately mixed with finely divided silver particles and the mixture sintered to provide a sintered electrode. Similarly, it has been found that the addition of lead or lead compounds to plastic-bound silver electrodes also causes the formation of the silver plumbate film discussed hereinbefore and provides the beneficial effects described.

Having described the present invention, that which is claimed as new is:

1. A silver positive electrode for alkaline battery applications having present therein a [lead compound] *material* selected from the group consisting of lead, lead oxide, lead hydroxide and sodium-plumbite in an amount of from about 0.1% to about 5% by weight of silver in the electrode.

2. A silver positive electrode for alkaline battery applications having present therein a [lead compound] *material* selected from the group consisting of lead, lead oxide, lead hydroxide and sodium-plumbite in an amount of from about 1% to about 3% by weight of silver in the electrode.

3. A positive battery electrode having an active material comprising the oxides of silver, said electrode being characterized by a surface coating of silver plumbate on the silver oxide particles.

4. A method of reducing the gassing of divalent silver oxide for use as positive electrode active material in alkaline electrolytes which comprises the formation on the particles of divalent silver oxide of a surface coating of silver plumbate.

5. The method of claim 4 wherein said silver plumbate coating is formed by intimately mixing a finely divided [lead compound] *material* selected from the group consisting of lead, lead oxide, lead hydroxide and sodium-plumbite with divalent silver oxide in an amount of from about 0.1% to about 5.0% by weight of said silver oxide and reacting said silver oxide and [lead compound mixture in a lead] *said finely divided material in an* alkaline electrolyte.

6. The method of claim 4 wherein said silver plumbate coating is formed by adding said divalent silver oxide to an alkaline electrolyte having a [compound of lead] *material* selected from the group consisting of lead, lead oxide, lead hydroxide and sodium-plumbite dissolved therein.

7. A method of reducing the resistance of a silver positive electrode which comprises the formation of a film of silver plumbate on the surface of the particles of silver oxide in the electrode.

*8. A silver positive electrode for alkaline battery applications having present therein a lead compound capable of forming silver plumbate in situ within the battery in an amount of from about 0.1% to about 5% by weight of silver in the electrode.*

*9. A silver positive electrode in accordance with claim 8 in which the lead compound is present in an amount of from about 1% to about 3% by weight of silver in the electrode.*

*10. A method of reducing the resistance of a silver positive electrode which comprises incorporating in a silver positive electrode a lead compound capable of forming silver plumbate in situ within an alkaline battery in anamount of from about 0.1% to about 5% by weight of silver in the electrode.*

*11. A method of reducing the impedance of an alkaline cell having a silver positive electrode which comprises adding to the alkaline electrolyte a lead compound capable of forming silver plumbate in situ within the battery in an amount of from about 0.1% to about 5% by weight of silver in the positive electrode.*

References Cited in the file of this patent or the original patent

UNITED STATES PATENTS 2,422,045 Ruben ---------- June 10, 1947

FOREIGN PATENTS 1,862 Great Britain ---------- of 1887